(12) United States Patent
Stilgenbauer et al.

(10) Patent No.: US 10,273,873 B2
(45) Date of Patent: Apr. 30, 2019

(54) MONO OR DUAL COAXIAL SLIDER VALVE FOR CONTROLLING A TWIN SCROLL TURBOCHARGER

(71) Applicant: BorgWarner Inc., Auburn Hills, MI (US)

(72) Inventors: Michael Stilgenbauer, Bolanden (DE); Matthias Ruh, Offenhelm (DE); Philip Parma, Rheinboellen (DE); Ivan Injac, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/533,488

(22) PCT Filed: Dec. 7, 2015

(86) PCT No.: PCT/US2015/064185
§ 371 (c)(1),
(2) Date: Jun. 6, 2017

(87) PCT Pub. No.: WO2016/094268
PCT Pub. Date: Jun. 16, 2016

(65) Prior Publication Data
US 2017/0370279 A1    Dec. 28, 2017

Related U.S. Application Data

(60) Provisional application No. 62/091,325, filed on Dec. 12, 2014, provisional application No. 62/132,013, filed on Mar. 12, 2015.

(51) Int. Cl.
*F02B 37/02* (2006.01)
*F16K 11/07* (2006.01)
*F02B 37/18* (2006.01)

(52) U.S. Cl.
CPC .......... *F02B 37/025* (2013.01); *F02B 37/183* (2013.01); *F16K 11/07* (2013.01); *Y02T 10/144* (2013.01)

(58) Field of Classification Search
CPC ...... F02B 37/025; F02B 37/183; F16K 11/07; Y02T 10/144
(Continued)

(56) References Cited

U.S. PATENT DOCUMENTS 4,530,640 A * 7/1985 MacInnes ............... F01D 9/026
   415/144
6,250,079 B1 * 6/2001 Zander ................. F02B 37/025
   60/602

(Continued)

FOREIGN PATENT DOCUMENTS

| DE | 102011115206 A1 | 3/2013 |
| DE | 202013100774 U1 | 3/2013 |
| DE | 202014100754 U1 | 3/2014 |

OTHER PUBLICATIONS

Written Opinion and International Search Report dated Apr. 15, 2016, in International Application No. PCT/US2015/064185.
(Continued)

*Primary Examiner* — Hoang M Nguyen
(74) *Attorney, Agent, or Firm* — Eric L. Doyle; Stephan A. Pendorf; Patent Central LLC

(57) ABSTRACT

A compact flow control valve capable of providing long service life in a very hostile environment. The valve is a mono or dual coaxial slider valve capable of controlling two different functions sequentially, at least one of the functions being controlled progressively. The flow control valve controls the fluid connection between two volutes (6, 7) of a turbine housing (2) of a turbocharger as well as the fluid
(Continued)

connection between the two volutes (6, 7) of the turbine housing (2) of the turbocharger and a waste gate port (9).

7 Claims, 15 Drawing Sheets

(58) Field of Classification Search
USPC .................. 60/602, 605.1, 605.2; 123/559.1
See application file for complete search history.

(56) References Cited

U.S. PATENT DOCUMENTS

| | | | |
|---|---|---|---|
| 2006/0070381 A1* | 4/2006 | Parlow .................... | F02B 37/00 60/612 |
| 2010/0059026 A1 | 3/2010 | Schmalzl | |
| 2014/0271138 A1* | 9/2014 | Markyvech ........... | F01D 17/105 415/146 |
| 2015/0315961 A1* | 11/2015 | Uhlenhake .............. | F02B 37/12 60/602 |

OTHER PUBLICATIONS

Chinese Office Action (with English language translation) dated Feb. 1, 2019, in Chinese Application No. 20150066024.X.

\* cited by examiner

MONO OR DUAL COAXIAL SLIDER VALVE FOR CONTROLLING A TWIN SCROLL TURBOCHARGER

BACKGROUND OF THE INVENTION

Field of the Invention

The invention concerns a compact flow control valve capable of providing long service life in a very hostile environment. The valve is a mono or dual coaxial slider valve capable of controlling two different functions sequentially, at least one of the functions being controlled progressively.

Description of the Related Art

Valves are used to control the flow of gases. A particularly harsh environment for valves is the turbocharger. Although a variety of valves has been developed and used with varying degrees of success in the past, as engine requirements evolve, greater demands are placed on the valves.

For example, to improve vehicle fuel economy, it is desired to keep the aerodynamic frontal area of the vehicle as small and streamlined as possible. The compactness of the engine compartment reduces the freedom for locating and orienting auxiliary equipment such as turbocharger actuators. To optimize use of space, the valve should be small, light weight, and freely assembled in any orientation, and it would be particularly advantageous for the valve to control more than one function.

Turbochargers are driven by exhaust gases. The outside of the turbine housing faces ambient air temperature while the volute surfaces contact exhaust gases ranging from 740° C. to 1050° C., depending on the type of combustion in the engine. Valves operating in exhaust gases are exposed to high temperatures and corrosive acids as well as soot particles which may accumulate on internal surfaces of the turbocharger. Any valve must be capable affording a tight seal and controllable opening, without corrosion or jamming due to soot or oil buildup. It would be advantageous to design a valve that is less susceptible to jamming.

The back-pressure within the turbine system can be in the region of up to 500 kPa. It would be advantageous to improve the design of a valve such as a wastegate so that it can be controlled with high precision, with minimal actuation force, without being adversely affected by high system pressures.

In a wastegated turbocharger, the turbine volute is fluidly connected to the turbine outlet downstream of the exducer by a bypass duct. Flow through the bypass duct is controlled by a valve known as a wastegate. To operate the wastegate, an actuating or control force must be transmitted from outside the turbine housing, through the turbine housing, to the wastegate inside the turbine housing. For example, a wastegate pivot shaft may extend through the turbine housing. Outside the turbine housing, an actuator is connected to a wastegate arm via a linkage, and the wastegate arm is connected to the wastegate pivot shaft. Inside the turbine housing, the pivot shaft is connected to the wastegate. Actuating force from the actuator is translated into rotation of the pivot shaft, pivoting the wastegate inside the turbine housing. The wastegate pivot shaft rotates in a cylindrical bushing, or directly contacts the turbine housing. Because the exhaust gas is under pressure, and because an annular gap exists between the shaft and the bore of the bushing, in which the shaft is located, an escape of hot, toxic exhaust gas and soot from the pressurized turbine housing is possible through this clearance. This is a source of hydrocarbon emissions that should be reduced. Gas and soot leakage from within a turbocharger to the ambient clean air surrounding a turbocharger is not permitted by engine manufacturers. A better containment of the turbocharger exhaust gasses is desirable.

Further, in conventional wastegate, the pressure at which the wastegate begins to open (the "lift off pressure") is critical to the operation thereof. The wastegate must be very carefully set when the pneumatic actuator and wastegate assembly are assembled to the turbocharger. The precise actuator can pressure, at which the diaphragm begins to move, is dependent upon the preload of the spring used. Variation in the manufacturing tolerances of springs means that variations in spring rate from one spring to the next is likely, and it is necessary to calibrate each turbocharger, individually, to determine the lift off pressure. It is desired to have a valve such as a wastegate that is precisely controllable and free of these manufacturing variations.

Attempts have been made to use a single actuator for dual functions. U.S. Pat. No. 4,893,474 teaches an exhaust gas driven turbocharger provided with a single pneumatic actuator which controls both a pivoting vane which varies the flow area or aspect ratio of the exhaust gas inlet passage to the turbine, and also controls a wastegate valve. A linkage mechanism including a preloaded spring and a bellcrank lever actuates levers controlling the wastegate valve and the pivoting vane. This design is however rather complex and thus liable to fail, is not compact, and requires multiple valves to control the multiple functions.

U.S. Pat. No. 8,196,403 (Caterpillar) teaches a turbocharger having a balance valve, a wastegate, and an actuator common to both the balance valve and the wastegate valve. A valve assembly may be associated with turbine to regulate a pressure of exhaust within EGR circuit. Valve assembly may include, among other things, a balance valve, a wastegate valve, and a common actuator. Balance valve may be configured to selectively allow exhaust from first volute to pass to second volute. Wastegate valve may be configured to selectively allow exhaust from second volute to bypass a turbine wheel of turbine. Common actuator may be controlled to move both balance valve and wastegate valve between flow passing and flow blocking positions. Valve assembly may be integral with turbine and at least partially enclosed by a valve housing that mounts to a turbine housing of turbine. The system however employs multiple flap valves which require substantial actuator force to close. The rotary shafts can become clogged and jam.

There is a need not only to be able to control multiple functions with a single actuator, but also to be able operate multiple functions with a single valve or valve assembly (hereafter valve). Further, there is a need for a valve which can be operated with minimal actuation force. Finally, there is a need for a valve which does not slam into end positions.

SUMMARY OF THE INVENTION

In accordance with the invention, a first embodiment is provided in the form of a dual sequential coaxial slider valve.

In simplified terms, two cup-shaped pistons slide coaxially in a cylindrical space. A wastegate opening is provided in the side of the cylinder. A projection extends from the top end of the cylinder into the cup of the inner piston. The projection includes an opening which communicates with a first volute. A second opening in the cylinder wall communicates with a second volute. When both pistons are extended, the inner cup covers the first volute opening in the projection and the second volute opening in the cylinder wall, preventing the volutes from communicating with each other, and the outer piston covers the wategate opening. When the inner piston is partially retracted, the openings to the first and second volutes are unblocked, and the volutes can "cross-talk". Then as inner piston is further retracted, it retracts the outer piston, which unblocks the wastegate opening, allowing communication between the first and second volutes and the wastegate.

More concretely, in this first embodiment the valve assembly is housed in a valve housing, which is preferably incorporated in a turbocharger turbine housing, but may be a separate add-on unit. The valve housing defines at least one cylindrical space having a longitudinal axis, and having at least a first opening in communication with a first gas passage (e.g., a first volute), a second opening in communication with a second gas passage (e.g., a second volute), and a third opening in communication with a third gas passage (e.g., wastegate). An inner piston or sleeve is slidable within the cylindrical space between a full closed and a full open position. The inner piston is connected, via a piston shaft, to a displacement means, such as a pneumatic or hydraulic actuator or stepper motor. The displacement means is provided to effect selective linear displacement of the inner piston between the full closed (extended) and the full open (retracted) position.

An outer piston is provided coaxial with the inner piston. To make this possible, the outer piston is provided with a bore extending through the longitudinal center axis. The piston shaft of the inner piston extends through the bore in the outer piston. The outer piston is slidable between a full closed position and a full open position. The stroke or travel of the outer piston is shorter than that of the inner piston. Spring means is provided for urging the outer piston towards it's full closed position.

When both pistons are in the full closed position, the first and second openings are closed by the inner piston, and the third opening is closed by the outer piston.

As the inner piston begins to be retracted from the full closed (full extended) position and in the direction of the full open (retracted) position:
  initially the inner piston travels independent of the outer piston and progressively unblocks the first and second openings,
  after unblocking the first and second openings, the inner piston abuts against the outer piston and begins to move the outer piston along with it against the force of the spring means, and
  finally the retraction of the inner piston causes retraction of the outer piston to the full open position of the outer piston, whereupon the third opening is fully unblocked, allowing communication between the first, second and third openings.

In the case that the dual sequential coaxial slider valve is provided in a turbocharger turbine housing, the first opening may communicate with a first volute, the second opening may communicate with a second volute, and the third opening may communicate with a wastegate passage. The two volutes of the turbine housing may be either of the twin volute type or the dual volute type.

Two separate exhaust flows may flow into the turbine inlet and be kept separated so that turbine wheel efficiency is increased by harnessing pulses. Here, the inner piston unblocking of the first and second openings would allow cross talk or balancing of flow between the cylinders as desired.

Alternatively, a single (blended) exhaust stream may flow from the engine into the turbine inlet and be directed to a single volute in the case that the exhaust mass flow is low, whereby the turbine acts like a small turbine. As the exhaust mass flow increases due to, e.g., acceleration of the engine, the inner piston may be moved to unblock the first and second openings, so that exhaust flow may leave the first volute and be shared between the two volutes, whereby the turbine housing acts like a large turbine housing. In the case that exhaust mass flow increases even further, into the range that there is danger of overdriving of the turbine, the inner piston may be moved towards the full open position, taking along the outer piston and moving the second position to the open position, whereby the wastegate opening is gradually unblocked as necessary.

Although the dual sequential coaxial slider valve design has aesthetic beauty, it was only arrived at following extensive evaluation of factors such as pressure, extreme temperatures and temperature gradients, and particle deposition the valve, the openings, the volutes, the bypass, considering their shape, orientation and direction. Much work, complex flow modeling, and structural analysis were required to design a turbocharger with walls of almost constant thickness despite the fact that there is a valve body with a very complex one part geometry fit into it and despite the requirement for undisturbed flow in the volutes. Details which appear trivial to the average person resulted from extensive work, testing and revising, ultimately arriving at the design of the first embodiment.

The slider valves according to the present invention differ from a typical flapper wastegate valve in an important respect: Typically, a wastegate comprises a wastegate passage extending from an exhaust gas passage to a wastegate seat, and a wastegate plug extending from a rotatable wastegate arm and having a profile for contacting the wastegate seat to cover the wastegate passage. Considerable force may be required to urge the wastegate plug to seat and remain in this closed position against the pressure of the exhaust gas in the exhaust gas passage. In contrast, in the present invention, with the openings introducing exhaust gas pressure perpendicular to the direction of movement of the slide valves (i.e., on side walls of the valve cylinder), the exhaust pressure would act perpendicular to the direction of movement of the slide valve, and thus have little or no influence on the movement of the slide valve in either the opening direction or the closing direction. Accordingly, the valve actuator can be designed to use a smaller, less powerful actuator motor, and response time of the valve may be faster. Finally, since exhaust gas pressure does not act on the valve in either direction of movement, the likelihood of the valve to slam into an end position is reduced.

In accordance with the invention, a second embodiment is provided, in the form of a single cup-shaped piston slider valve.

In simple terms, a cylindrical valve housing may be located in a divider wall between two volutes. When a single cup shaped piston is in the full extended position, communication between the volutes is blocked. A projection extends from the end of the cylinder into the cup of the piston. Two separate wastegate ports are provided within the projection. First and second openings are provided in the cylinder wall, respectively in communication with the first and second volutes. When the cup shaped piston is in the full extended position, all openings are blocked. When the cup shaped piston is retracted a few mm, the independent wastegate openings are partially opened, allowing exhaust gas to escape from the volutes to the wastegates, without however any communication between the volutes. A lip is provided block gas communicating between volutes. As piston is pulled further back, the piston clears the lip, and gas flows not only into wastegate but also can crosstalk between the volutes.

In more concrete terms, in this second embodiment a single sliding valve is used. As in the first embodiment, in this second embodiment the cylindrical valve housing is provided with openings which may be in communication with the a first volute, a second volute and with one or more wastegate openings. Depending upon the location of the openings, it becomes possible, as the valve is retracted from the open position, to (a) first bleed off excess gas from first and second volutes through first and second wastegate openings, independently, and thereafter to allow crosstalk between the volutes, or to (b) first interconnect the volutes, and subsenquently to bleed off excess gas through the wastegate, or (c) to gradually unblock all three openings at the same time. The single valve may be operated pneumatically or electrically, and may or may not incorporate a spring to bias the valve in the closed position.

The problem in dual volute wastegates of the prior art is that they merely bleed of exhaust gas. The volutes are connected via the wastegate, but since the exhaust gas has a mass inertia and is directed towards the exit of the wastegate channel, it will not flow between the volutes, leading to possible pressure differences. It has now surprisingly been discovered that it is advantageous to interconnect volutes, even if exhaust gas is already being bled off. That is, contrary to conventional wisdom, there are benefits in a system which provides for first bleeding off excess gas and then interconnecting volutes.

The defining characteristic of the invention is the design of the valve or valves as a cup-shaped sliding valve rather than a rotating valve or a flapper valve. Since exhaust gas pressure acts on the valve perpendicular to the direction of travel of the valve, actuation pressure can be kept low, valve slamming into end positions is avoided, and valve preadjustment can be dispensed with.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Figure 1A:
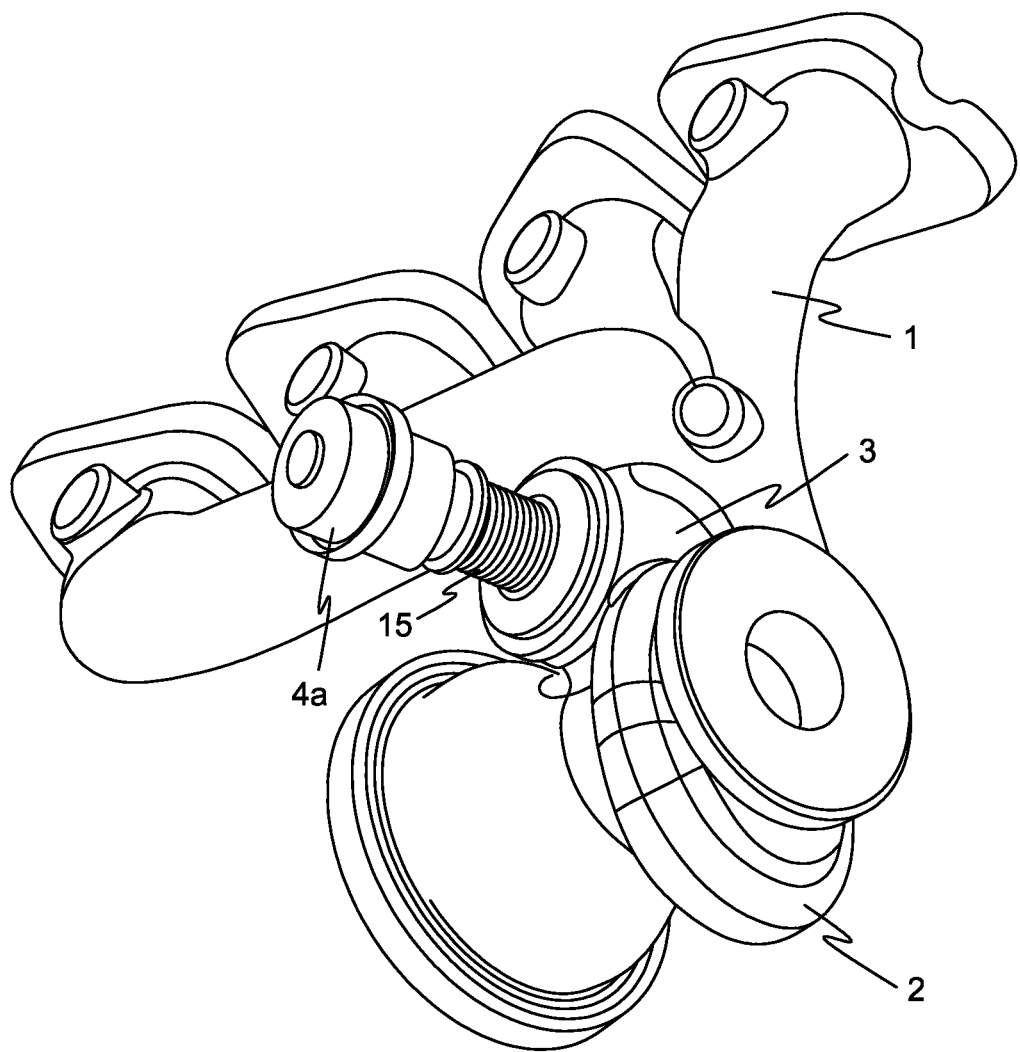
FIG. 1A depicts an exhaust manifold and turbocharger turbine from the side facing a not-shown bearing housing, with a dual sequential coaxial slider valve at the turbine inlet.
Figure 1B:
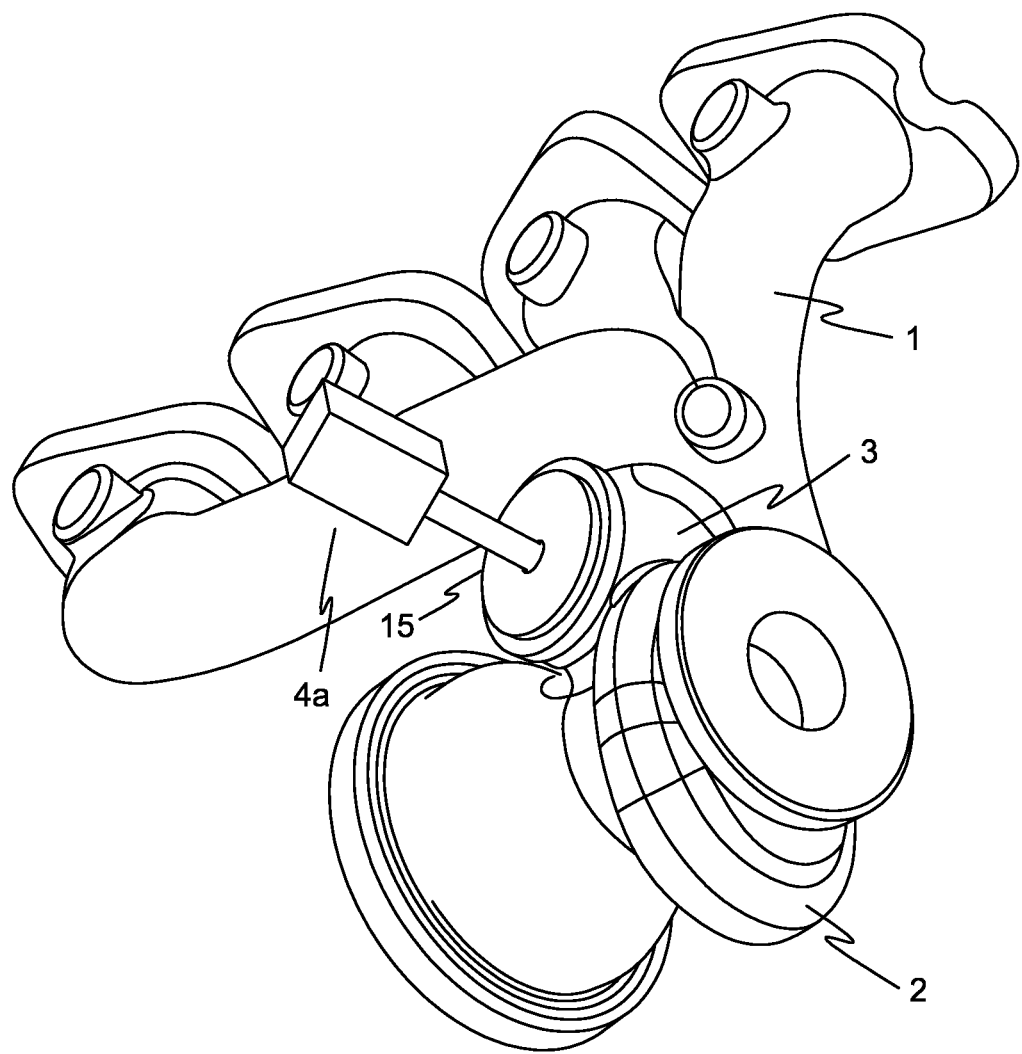
FIG. 1B corresponds to FIG. 1A except that the pneumatic actuator is replaced with an electric actuator.

FIG. 1A illustrates the general arrangement of an exhaust manifold 1 through which exhaust flows from an engine (not shown) to an inlet of a twin volute type or dual volute type turbocharger turbine housing 2. According to the first embodiment of the invention, a dual sequential coaxial slider valve housing 3 is integrated in the turbine housing at the turbine inlet. A single pneumatic actuator 4a controls the movement of two coaxial pistons of the dual sequential coaxial slider valve. FIG. 1B is identical to FIG. 1A, except that pneumatic actuator 4a is replaced with electric actuator 4b. In FIG. 1B, in particular, spring 15 may be omitted. The turbocharger bearing housing and compressor would be attached to the right side of the turbine housing 2.

Figure 2:
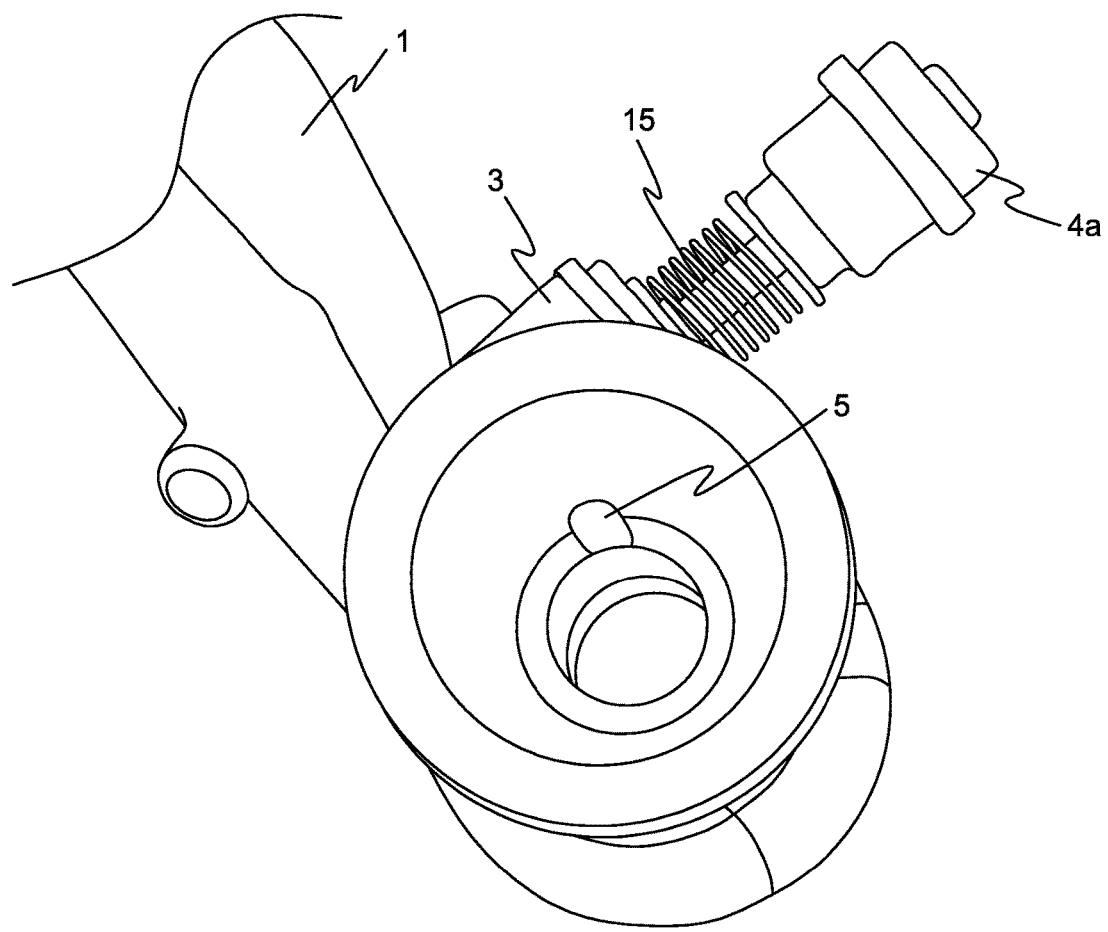
FIG. 2 shows the turbocharger turbine of FIG. 1A, from the side of the turbine outlet.

FIG. 2 shows the turbocharger turbine of FIG. 1 from the side of the turbine outlet. Wastegate port 5 can be seen downstream of the turbocharger turbine wheel space. While a single pneumatic can type actuator is shown in FIGS. 1 and 2, it is of course possible to use more than one actuators. More preferably, electric actuators are used in place of cans. Such electric actuators are well known and need not be described in detail herein. The actuator(s) can be controlled by an electric valve for making sure the engine CPU can override p1 or p2.

Figure 3:
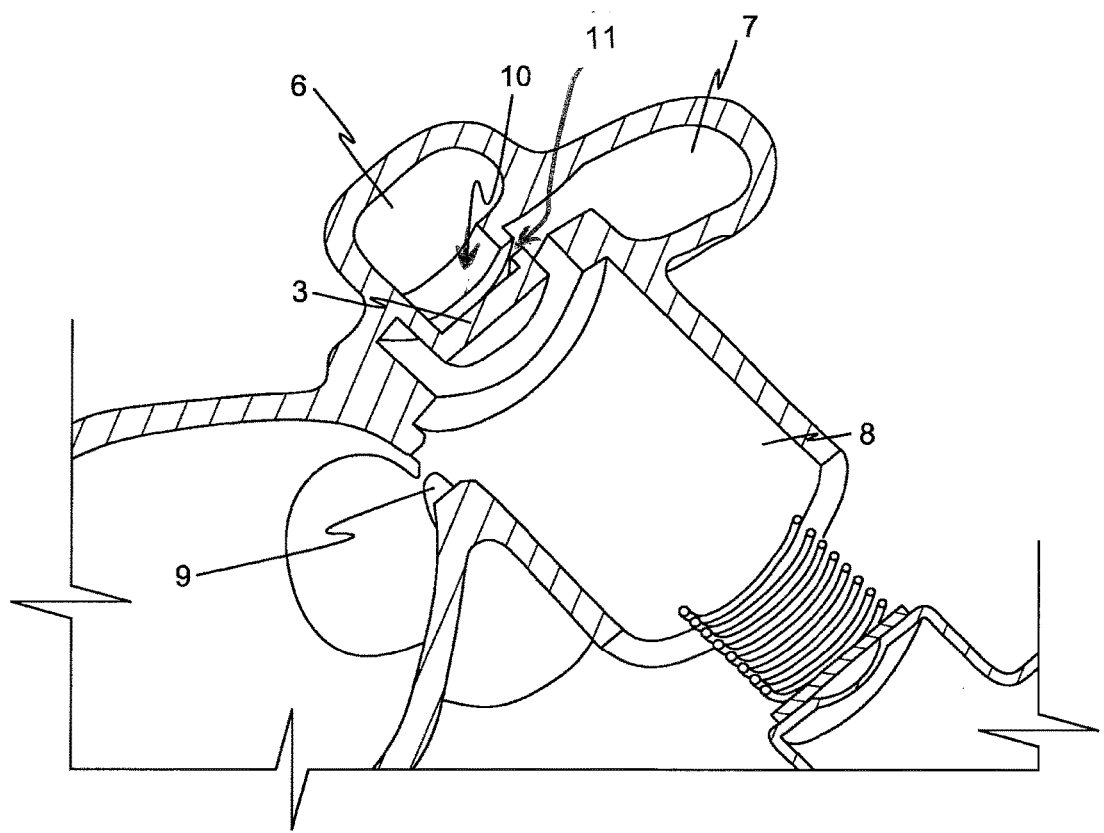
FIG. 3 shows a section through the turbine housing, showing first and second openings communicating with first and second volutes, the third opening being a wastegate opening, and showing the cylindrical space housing the valve.

FIG. 3 shows a section through the valve housing and turbine housing, with valve pistons omitted, showing first and second openings 10, 11 communicating with first and second volutes 6, 7. The wastegate port opening 9 is also shown. All three openings communicate with the cylindrical space of the valve.

As shown in FIG. 3, it is not necessary that all openings be provided on the side walls of the valve cylinder of the valve housing 3, radially outward of the slider valve. Rather, in the case that the head of the inner piston is formed in a "cup" shape with a recessed piston head rather than a solid piston head, the end of the valve cylinder opposite the actuator may be provided with a cylindrical protrusion 3a having a diameter corresponding to the diameter of the recess in the inner piston valve head and having a passage therein connecting, for example, to the first opening 10 to the first volute 6. In this case, the direction of exhaust gas pressure communicated to the valve may be radially outward rather than radially inward as in the case of the second and third openings, but since the pressure is still perpendicular to the direction of sliding of the valves, it remains the case that there is little or no interference of the exhaust gas pressure with the opening or closing of the valves.

Figure 4:
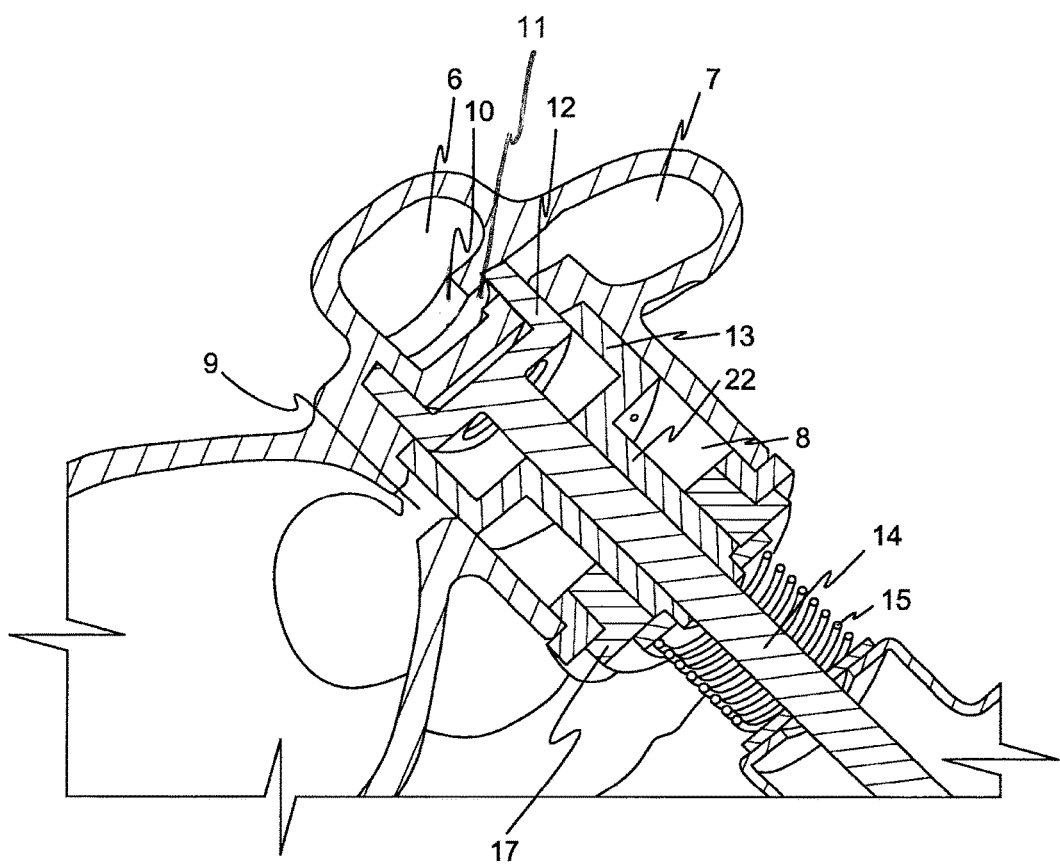
FIG. 4 shows in section along the longitudinal axis the arrangement of inner and outer pistons of the valve in the fully closed position.

FIG. 4 shows in section the arrangement of inner and outer pistons 12, 13 of the valve in the fully closed position within the valve housing which defines at least one cylindrical space 8 having a longitudinal axis, and having at least a first opening 10, a second opening 11, and third opening 9. A inner piston 12 is slidable within the cylindrical space between a full closed and a full open position, of which the fully closed position is shown here, the inner piston covering first and second openings 10 and 11, which in this illustrated embodiment are in communication with first and second volutes. In this closed position of the inner piston, the first volute 6 and second volute 7 are insulated from each other, and pulse energy from the cylinders is transmitted to the turbine wheel (twin volute turbine housing) or all exhaust flow is directed to the first volute and not shared with the second volute (dual volute turbine housing). Both the first and second opening may be provided on the sidewalls of the cylindrical valve body, or, as shown in FIG. 4, the second opening 11 may be provided on the cylinder side wall 3, and the first opening 10 may be provided in a projection extending from the end of the cylinder opposite the actuator and dimensioned to be received in a corresponding recess in the cup-shaped head of the inner piston 12. In this embodiment, the inner wall of the cup shaped piston head seals the first opening 10 of the projection 3a and the outer wall of the cup seals the second opening 11 when the inner piston is in the closed position.

The inner piston 12 has a piston shaft 14. Displacement means, such as a pneumatic actuator 4a or hydraulic actuator or stepper motor 4b is operatively associated with the piston shaft 14 to effect selective linear displacement of the inner piston between the full closed and the full open position. The outer piston 13 has a piston shaft 22 and is provided coaxial with the inner piston. The outer piston has a center axis and has a bore along the center axis extending through the piston head and shaft. The outer piston 13 is slidable between a full closed (extended) position and a full open (retracted) position, of which the full closed position is shown here. Optional spring means 15 is provided for urging the outer piston towards the full closed position as shown in FIG. 4. In particular, in the case that the actuator is electrical rather than pneumatic, the spring means may be dispensed with, and both valve movements be controlled by the electric actuator. As a further alternative, while the spring provides a simple and inexpensive way to have one actuator control two valves (one active, the other passive), it is of course possible to have two actuators, with the first actuator controlling the inner piston and the second actuator controlling the outer piston independent of the inner piston.

In the full closed position as shown in FIG. 4 the first and second openings 10, 11 are blocked by the inner piston 12 and the third opening 9 is blocked by the outer piston 13.

Figure 5:
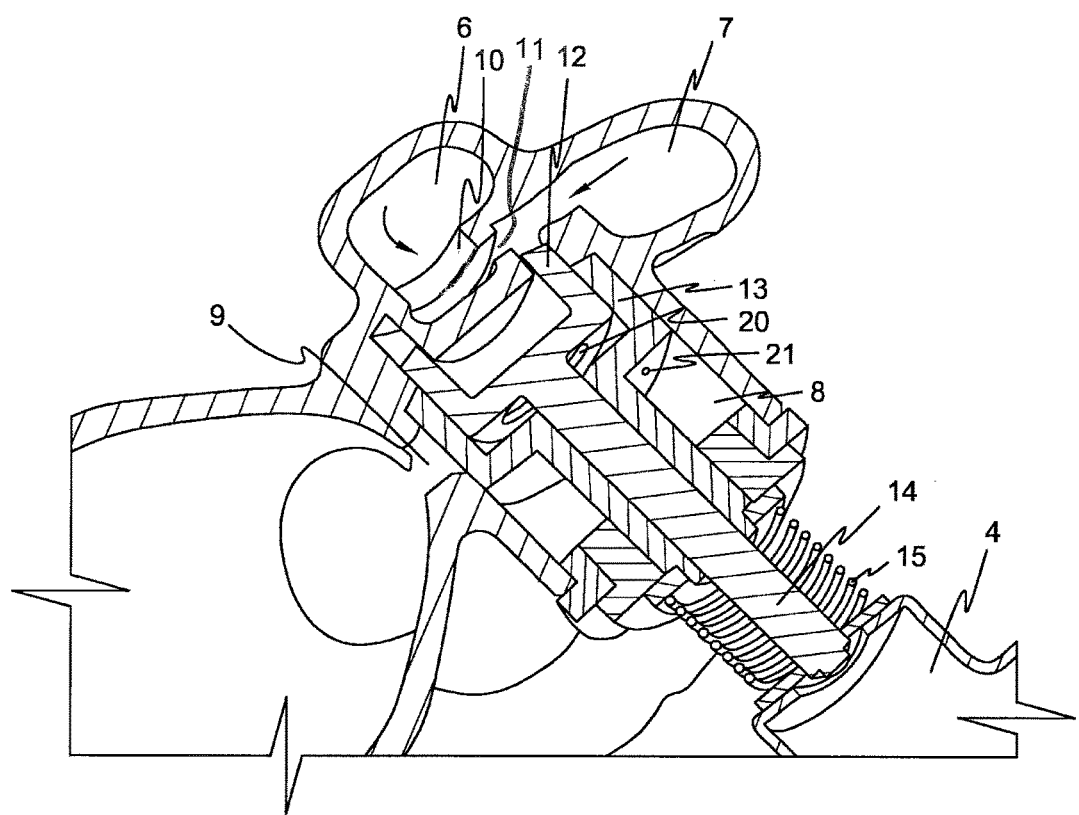
FIG. 5 shows the inner piston in the partially open position, in which first and second volutes are in communication.

FIG. 5 shows the inner piston 12 in the partially open (partially retracted) position, in which first and second volutes 6, 7 are in communication via first and second openings 10, 11 and cylindrical space 8. At this point, the outer piston has not yet moved, and continues to block the wastegate port 9.

Figure 6:
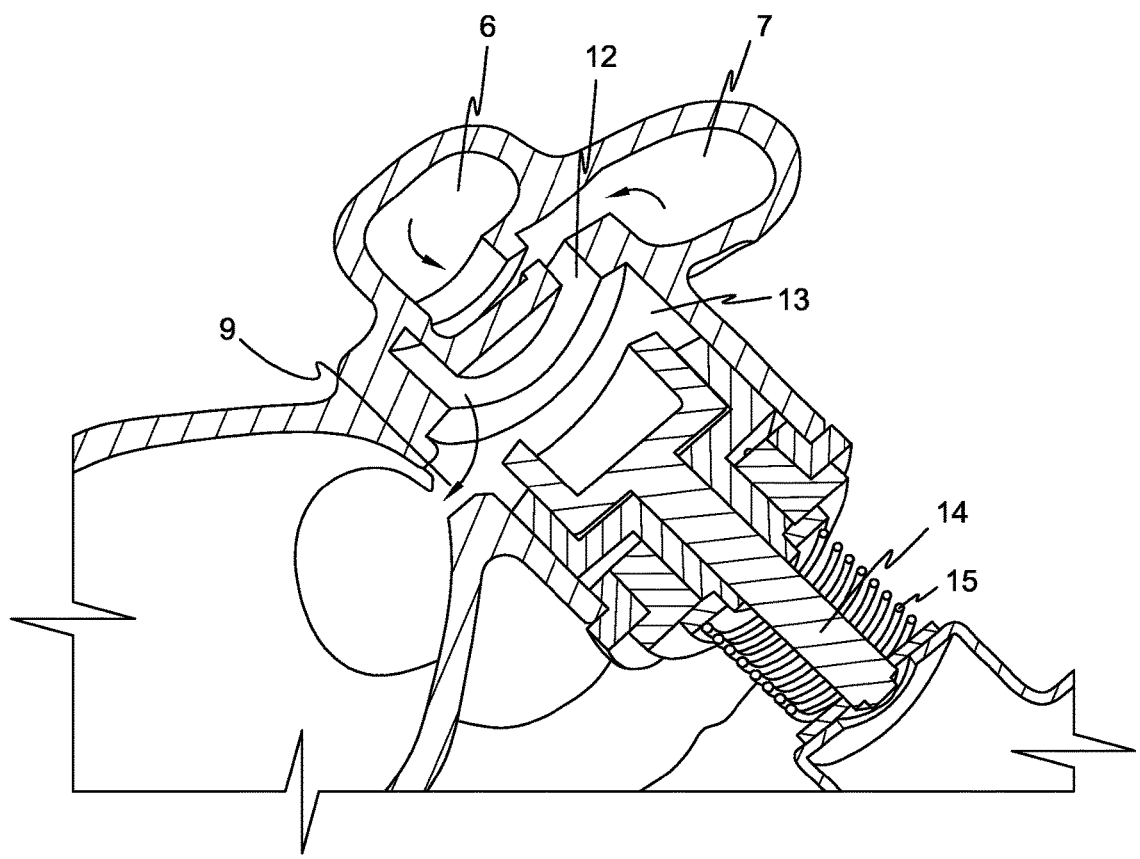
FIG. 6 shows the valve in cross-section with both pistons in the fully open position and the wastegate opening in communication with the first and second volutes.

As the inner piston 12 continues moving toward the fully open position, it contacts the outer piston, and begins to move the outer piston along with it against the spring force of spring means 15, so that wastegate port 9 is progressively or completely unblocked. FIG. 6 shows the dual coaxial slider valve in cross-section with both pistons in the fully open position and the wastegate opening in communication with the first and second volutes, with exhaust gas flow shown with arrows.

As can be seen from the above, not only does the present invention make it possible to progressively control two functions (cross-connection of volutes for reduction of pulses and balancing of power; opening of wastegate) with a single actuator, the invention makes it possible to control both functions with a single compact dual coaxial slider valve. Thus, the valve according to the invention is particularly advantageously easily accommodated in compact engine compartments.

The inner and outer piston can have various designs, e.g., they could have a conventional combustion engine piston design, or even have solid piston heads. However, by providing the pistons in the hollow or "cup" design shown, the greatest amount of sealing action can take place with the minimum of space and weight. With less weight, the inertia of the valves is reduced, thus response time is faster.

Further, by designing the valve as an axially displaceable valve rather than a more conventional rotary valve, the problem of soot, oil and corrosive particle buildup is reduced. It is believed that the axial movement of the pistons and in particular the inner piston shaft in the bore of the outer piston, acts in a self-cleaning manner to keep parts polished and non-sticking.

Further, even though a single actuator controls two pistons, the amount of axial movement needed to control flow of exhaust gas is small and can be precisely controlled.

In accordance with the invention, a second embodiment is provided, in the form of a mono slider valve.

Figure 7:
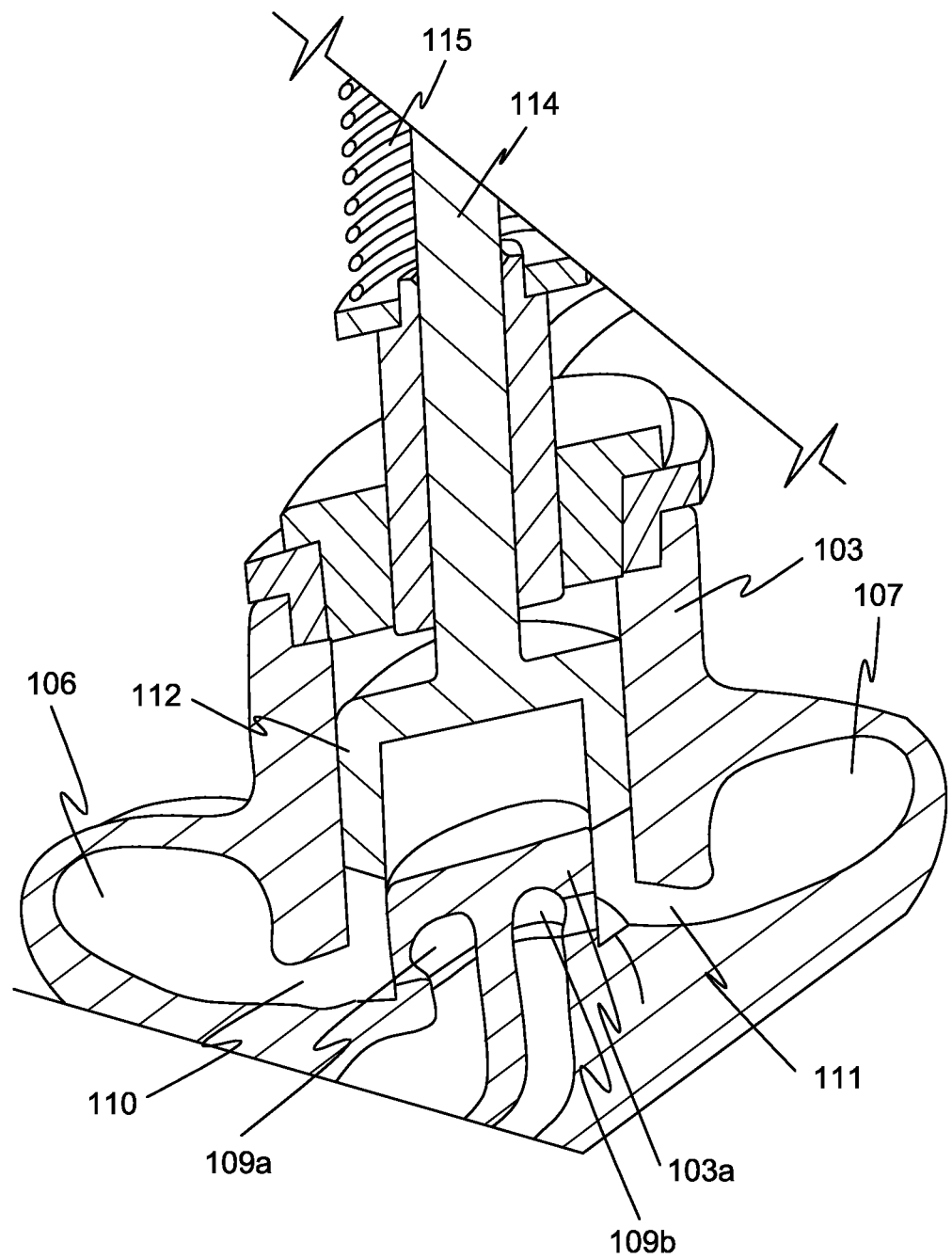
FIG. 7 shows a first view of a mono sequential slider valve according to a second embodiment of the invention.
Figure 9:
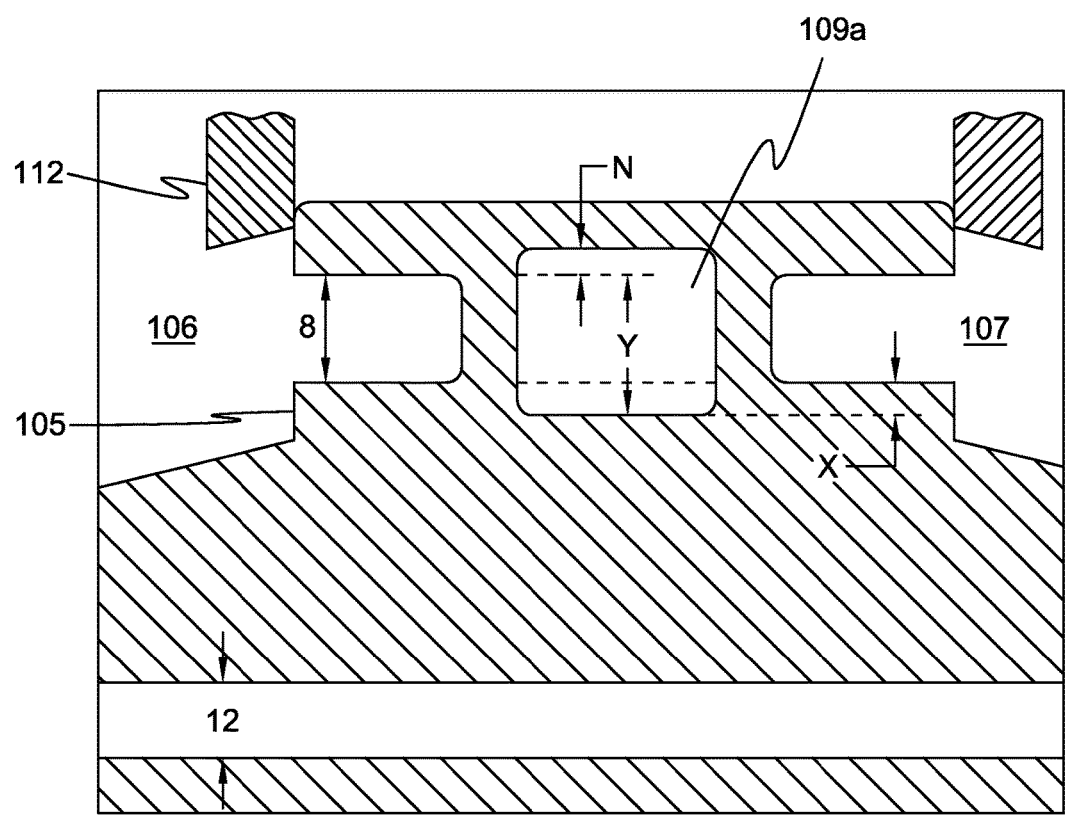
FIG. 9 illustrates the role of the lip in the single slider.

In this second embodiment, only one sliding valve is used, preferably integrated in a dividing wall dividing the dual or twin volutes. As in the first embodiment, in this second embodiment as shown in FIG. 7 the cylindrical valve housing 103 is provided with opening 110 which may be in communication with the first volute 106, opening 111 which may be in communication with the second volute 107, and with twin wastegate openings 109a and 109b. The valve housing may be provided with one wastegate opening or twin wastegate opening 109a, 109b. Depending upon the location of the openings, it becomes possible, in a twin volute turbine housing, as the engine begins to accelerate and valve piston 112 is retracted from the open position, to initially maintain pulse flow to the turbine wheel (i.e., no cross talk between volutes) while bleeding off excess gas through the wastegate (see gap "x" in FIG. 9), with excess flow from volute 106 flowing to wastegate 109a and excess flow from volute 107 flowing to wastegage 109b without interfering with or killing the pulse energy. This is possible due to the presence of lip 105 which, during initial retraction of the piston 112, blocks communication between the two volutes, but does not block communication between the volutes 106, 107 and their respective wastegates 109a, 109b (gap "x"). This is an improvement over conventional dual or twin volute design in which the exhaust gas, with its mass inertia directed towards the exit of the wastegate channel, will not flow between the volutes, leading to possible pressure differences.

Subsequently, as engine speed increases further, the piston is retracted further (opening gap "x" plus "y" in FIG. 9), the volutes are interconnected, which either looses pulse energy to reduce turbine efficiency (twin volutes) or changes exhaust flow from being limited to one volute to now flowing into two volutes (dual volute), but this is the desired outcome at this stage. Finally, if the engine is driven hard and produces excessive exhaust, it may be possible to further open the waste gate (gap "z" in FIG. 9) to spill the excess exhaust and prevent overdrive of the turbocharger. The single valve may be operated pneumatically or electrically, and may or may not incorporate a spring 115 to bias the valve in the closed position.

Figure 8:
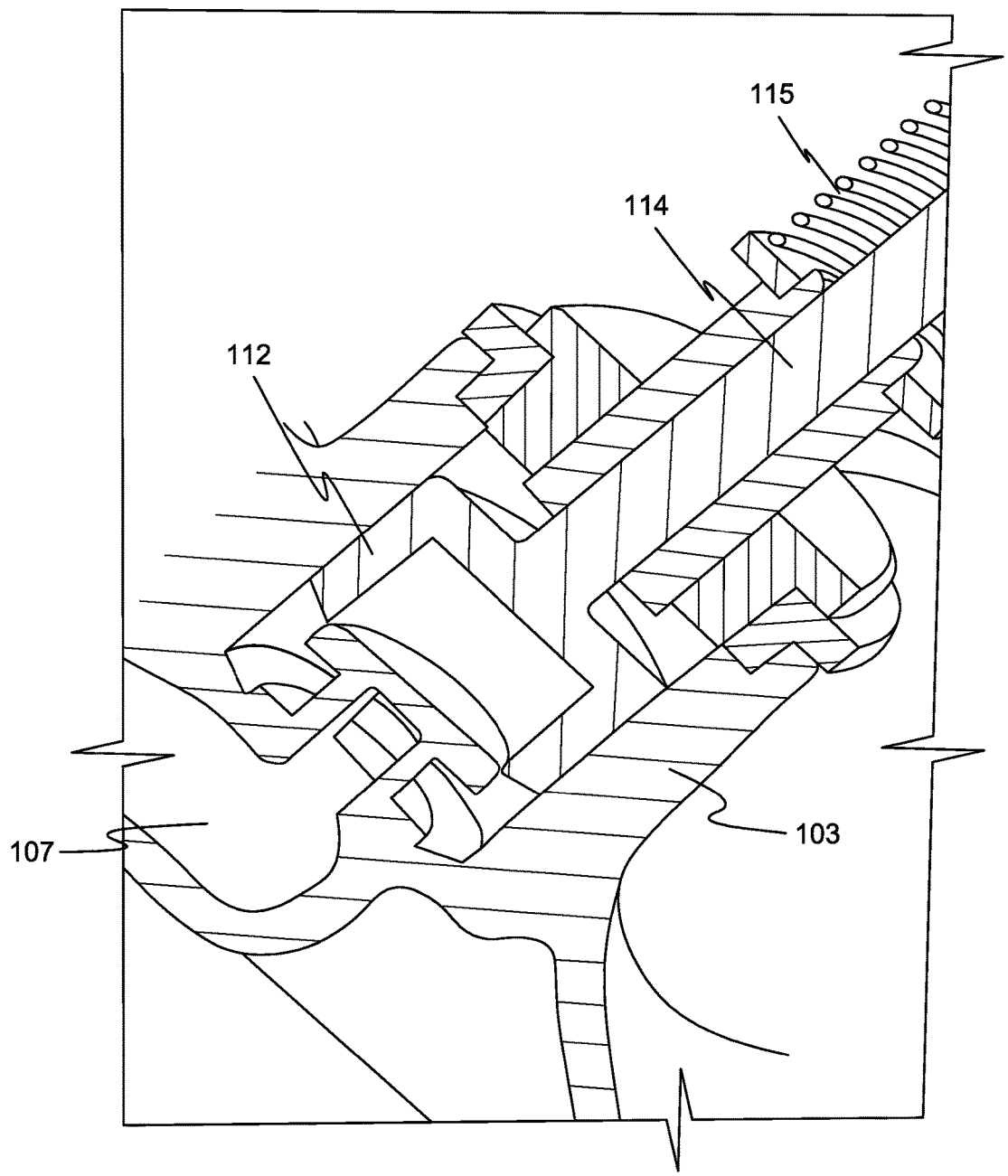
FIG. 8 corresponds to the slider valve of FIG. 7, rotated 90°

The problem in dual volute wastegates of the prior art is that they merely bleed off exhaust gas. The volutes are connected via the wastegate, but since the exhaust gas has a mass inertia and is directed towards the exit of the wastegate channel, it will not flow between the volutes, leading to possible pressure differences. It has now surprisingly been discovered that it is advantageous to interconnect volutes, even if exhaust gas is already being bled off. Contrary to conventional wisdom, there are benefits even in the case of first bleeding off excess gas and then interconnecting volutes.

Where FIG. 7 shows how volutes 106, 107 can communicate with wastegate openings 109a, 109b which do not have a lip, while a lip is provided in the area of the volute-to-volute connection. FIG. 8 corresponds to FIG. 7 and is rotated 90° and shows the volute 107 to volute connection.

Of course, where desired, the valving could be designed to reduce turbine efficiency first by interconnecting the volutes, and subsequently, as exhaust flow increases, opening the wastegate.

Figure 10:
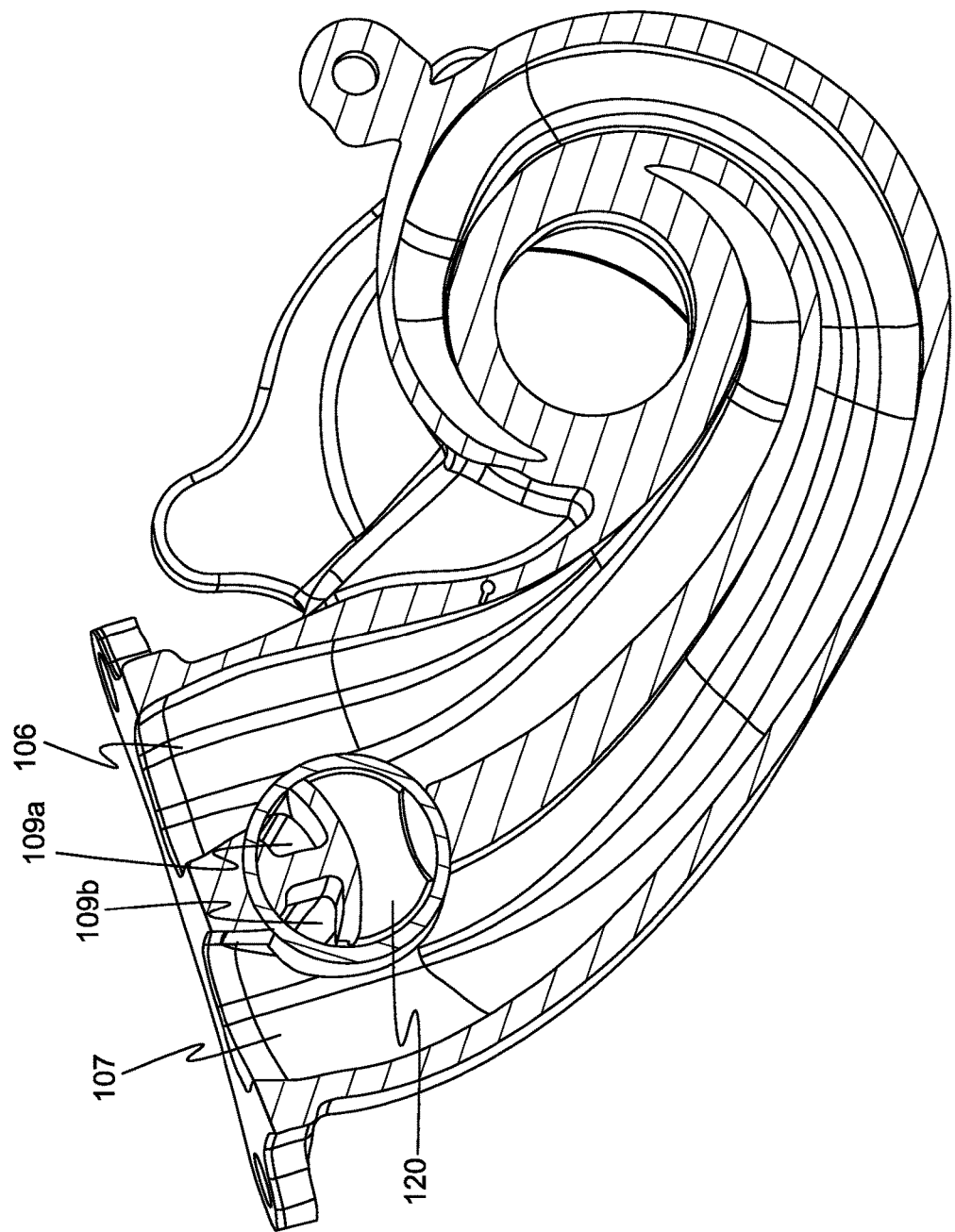
FIG. 10 shows a section through a turbocharger turbine housing for a mono slider valve, with slider valve omitted.

FIG. 10 is a section perpendicular to the axis of the valve, and shows a twin scroll turbine housing with volutes 106, 107, with the cylindrical valve housing integrated in a divider wall dividing the volutes, with wastegate 109a, 109b, and with a channel 120 for communication between the volutes.

Figure 11:
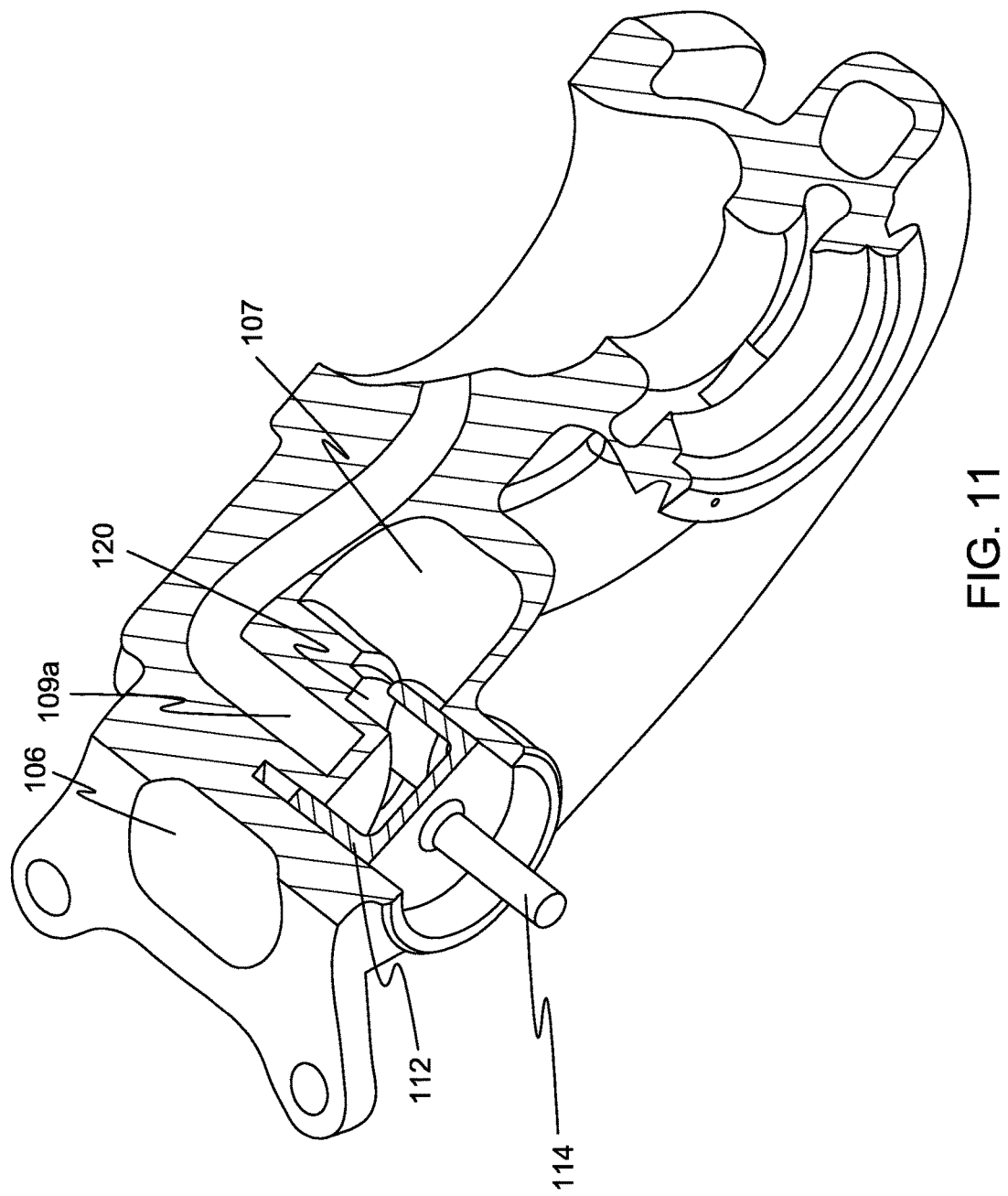
FIG. 11 is an elevated oblique view of a section of the turbine housing of FIG. 10, with mono slider valve in place, with slider valve in the position allowing cross-talk between volutes.

FIG. 11 is a section parallel to the axis of the valve, showing wastegate 109a and channel 120 for communication between the volutes.

Figure 12B:
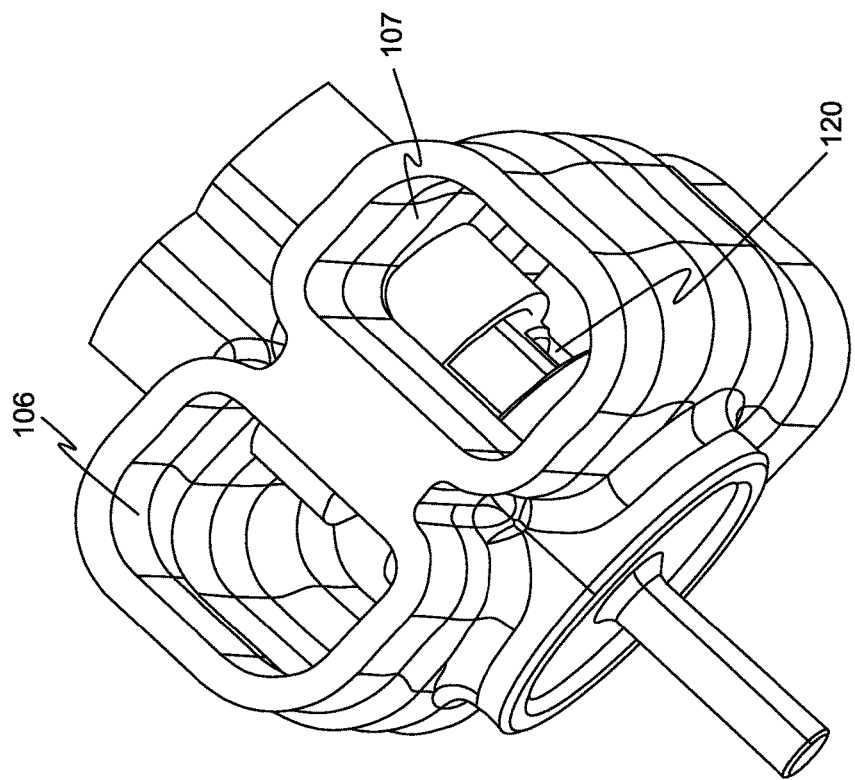
FIGS. 12A,B show the location of the valve in a divider wall of a dual or twin volute turbine housing, showing the valve retracted to expose the channel.
Figure 12A:
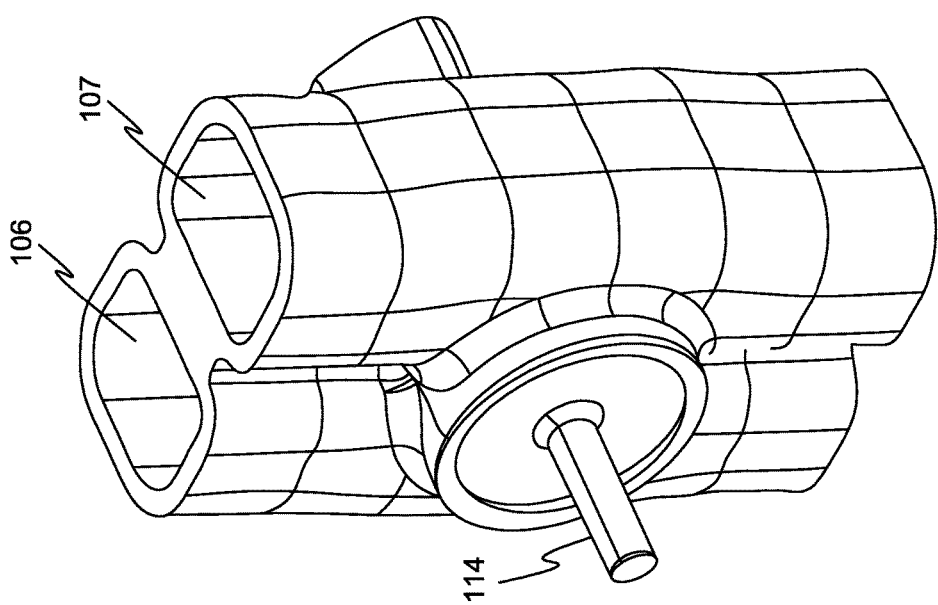

FIGS. 12A and 12B are CAD type drawings showing location of the valve in a divider wall of a dual or twin volute turbine housing, showing the valve retracted to expose channel 120.

Figure 13:
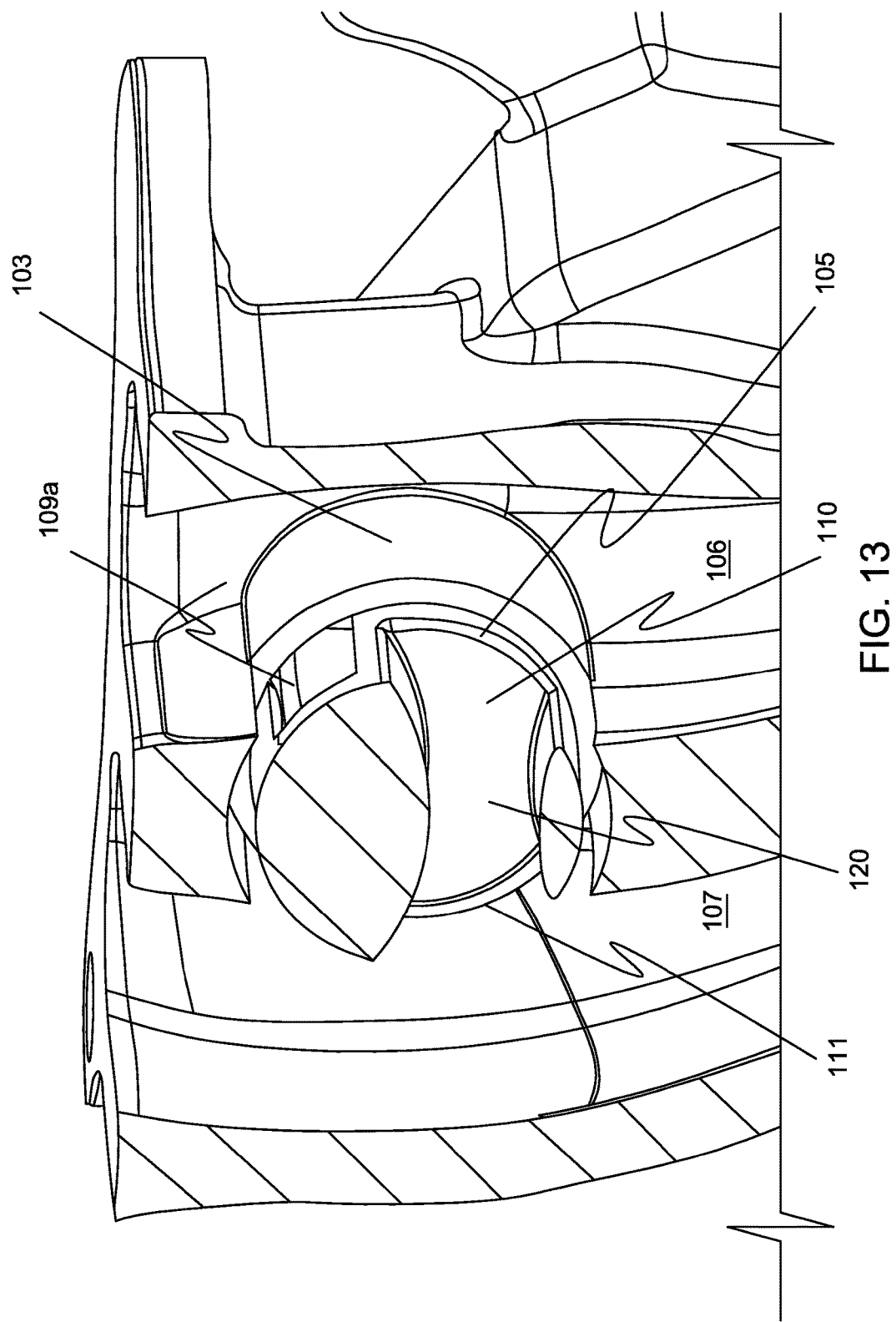
FIG. 13 is a close up view of one side of the turbine housing for a mono slider valve with valve removed, showing one of two wastegate openings and showing volute cross-talk openings.

FIG. 13 is a cross section similar to FIG. 10, but where FIG. 10 sectioned through the wastegate channels 109a, 109b, FIG. 13 does not section through the wastegate channels, and shows the complete three-dimensional structure projecting from the end of the cylindrical space of the valve housing 103 into the cylindrical space, with cup-shaped piston removed.

Figure 14:
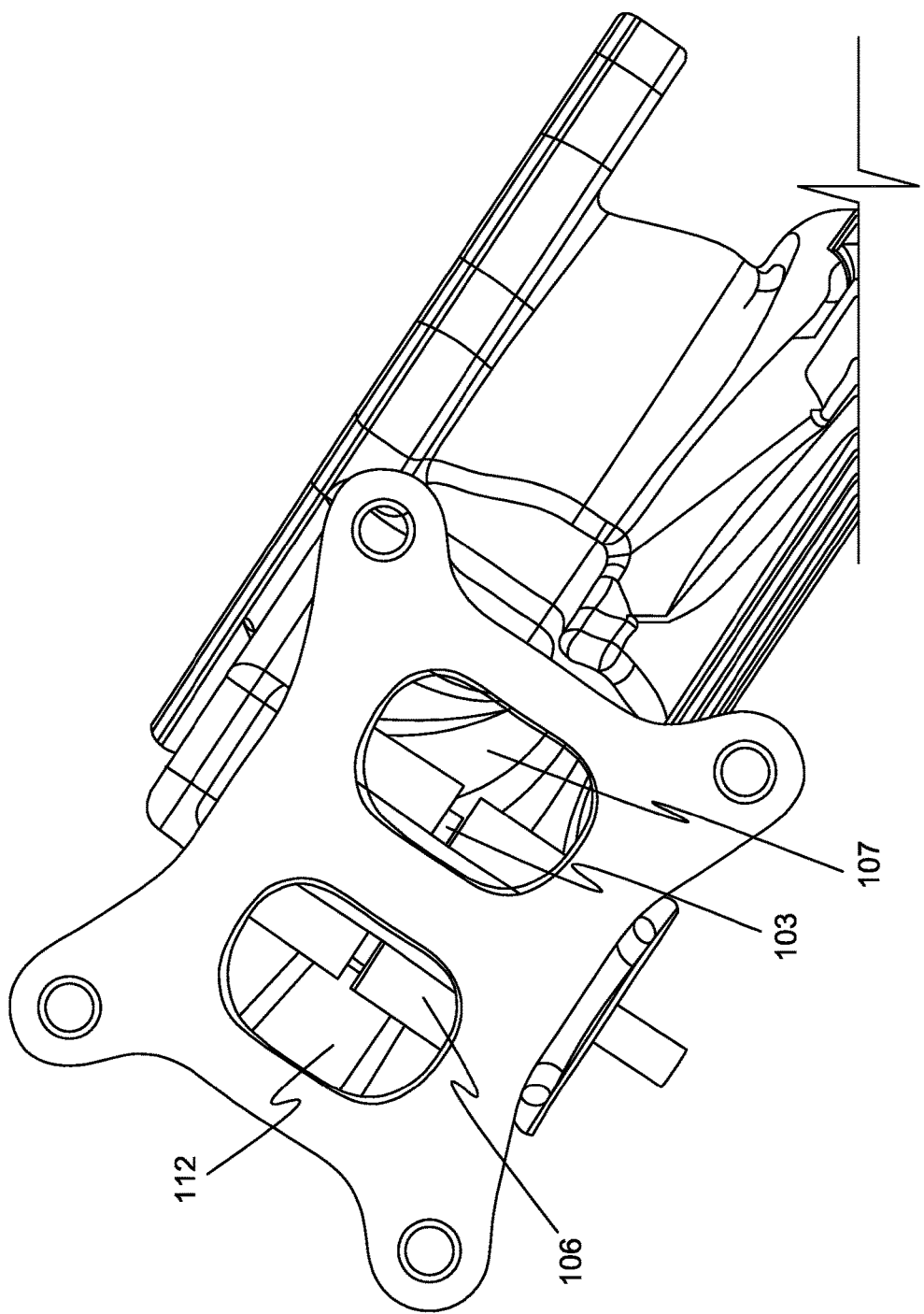
FIG. 14 is a top view of the turbocharger turbine hosing with slider valve retracted only sufficiently to partially open wastegate openings.

FIG. 14 is a CAD type drawing, looking into the volutes 106, 107 in the direction of flow of exhaust gas, and showing valve 112 slightly retracted, exposing lip 103.

In a variation of the above illustrative embodiments, rather than forming the piston as a perfect cylinder, it is of course possible to form openings or passages in the piston itself in addition to the cylinder walls. For example, a generally cylindrical valve housing may be formed integrated in the turbine divider wall or in a wall separating the two sets of manifolds of a twin volute type turbocharger system, the valve housing having a first opening facing a first volute and a second opening facing the second volute. In a first position of the piston, there are no openings or recesses in the piston, and both openings are blocked. As the sliding piston is advanced, it first presents a passage through or over the piston allowing the first and second volutes to communicate. As the piston is advanced further, one or both openings are put into communication with a wastegate passage. Of course, the piston could be designed so that the wastegate is connected to the volutes before the volutes are connected to each other.

It is very significant that the valve is designed so that exhaust gas pressure acts on the inner and outer pistons radially and not in the axial direction of the piston. The radial forces can be distributed about the circumference of the piston and thus canceled out. It is significant that the gas pressure acts radially, since the two pistons of the inventive valve are actuated in the axial direction. As a result, the actuator does not have to counter the exhaust pressure, as in the case of a conventional flapper valve with rotary actuation.

A benefit of using a single actuator and single valve assembly is in reduction of particulate emissions. High pressure inside the turbine stage can result in the escape of exhaust gas to the atmosphere through any apertures or gaps. Passage of the exhaust gas through these apertures is usually accompanied by black soot residue on the exit side of the gas escape path. Deposits of this soot, generated by the engine combustion process, is unwanted from a cosmetic standpoint. This makes exhaust leaks a particularly sensitive concern in vehicles such as ambulances and buses. From an emissions standpoint, the soot which escapes from the turbine stage is not captured and treated by the engine/vehicle aftertreatment systems. Since the present valve has only one entry point into the turbocharger, emissions are more easily controlled.

The valve system according to the invention can be adapted to various turbocharger designs for functions. The longitudinal axis of the dual coaxial slider valve can be parallel to the turbocharger rotating assembly axis of rotation, may be perpendicular thereto, or may be any other orientation. The dual coaxial slider valve cylindrical space can be cast into the turbine housing, or may be manufactured as a separate component and bolted on to the turbine housing at the inlet.

As can be seen from FIG. 4, the components of the inventive valve, i.e., the pistons, can be easily assembled and introduced into the valve cylindrical space, and capped with a solid grommet 17.

In order for the two pistons to be able to move relative to each other, it is necessary to provide pressure release vents 20, 21 so that movement is not impeded by pressure or vapor lock.

The final design of the pistons, the valve housing, the location of the openings and the location of the valve housing will depend upon the type of turbocharger and the particular manner of control of exhaust gas flow to be achieved, which would be tailored to a particular engine or to achieve a target performance. The two-volute turbine housing may be a twin-channel or twin volute turbine housing with virtually identical spiral grooves used in pulse charging, or a double-channel or dual volute turbine housing with either axially or radially adjacently arranged spiral channels of different lengths and/or volumes, as used in pressure charging. The housing may or may not have a wastegate.

Basically, part of the physical design of the turbine housing is a volute, or pair of volutes, the function of which is to control the inlet conditions to the turbine wheel such that the inlet flow conditions provide the most efficient transfer of power from the energy in the exhaust gas to the power developed by the turbine wheel, combined with the best transient response characteristics. Theoretically the incoming exhaust flow from the engine is delivered in a uniform manner from the volute to a vortex centered on the turbine wheel axis. To do this, ideally, the cross sectional area of the volute is at a maximum perpendicular to the direction of flow, gradually and continuously decreasing until it becomes zero. The inner boundary of the volute can be a perfect circle, defined as the base circle or, in certain cases, such as a twin volute, a spiral of minimum diameter not less than 106% of the turbine wheel diameter.

When applying this to turbochargers, particularly automotive turbochargers with constantly changing loads (compared to, e.g., a generator which operates at steady speed) it is important to cover a wide range of engine speed and torque. To cover this with one turbocharger, there are variable geometry turbochargers that can adapt the output torque of the charger. For petrol engines, this is very expensive because the material needs to be able to withstand very high temperatures (1000° C. instead of 900° C. in Diesel applications).

Therefore, ways of expanding the working range of the turbine regulation are sought. One cheap and efficient way is interconnecting volutes in certain working conditions when the turbine torque needs to be reduced, and bleeding off exhaust gas of either one or both volutes downstream of the turbine to bypass the turbine wheel when the torque needs to be further reduced. The mono and dual slide valves of the present invention are particularly effective, efficient and durable when used to provide such controlled interconnecting. The control of interconnecting may be freely applied to a variety of systems.

Most Diesel turbine housings are of the divided variety with a radial divider wall separating the two volutes to maintain the pulse energy to the turbine wheel. The divider wall length is typically such that the inner bound is approximately at the base circle. The closer the tip of the divider wall is to the base circle, the greater the preservation of pulse energy but the greater propensity for cracking of the casting in the divider wall. The reasons for this cracking are many but predominant are the dross which is pushed through the pattern at the casting process which means that the integrity of the material near the tip of the divider wall is less than optimal, and the second is the fact that the temperature distribution around the volutes causes the casting to want to "unwind". The thermal forces generating the "unwinding" of the turbine housing are resisted by the vertical divider wall, the resultant being cracking in the wall. While a crack does little physical damage, the next step in cracking is for pieces of cast iron divider wall to separate from the casting and be ingested by the turbocharger or engine which can cause terminal damage.

In so-called ignition sequence exhaust manifolds of internal combustion engines, such as in particular of spark-ignition engines, in each case the exhaust gas of those cylinders which are not in direct succession in the ignition sequence is merged. For example, in a four-cylinder engine, cylinder 1 and cylinder 4 and also cylinder 2 and cylinder 3 are merged in the case of a cylinder ignition sequence of 1-3-4-2. This firstly permits, especially in four-cylinder engines, a reduction in the mutual influencing of the cylinders during the charge exchange as a result of lower residual gas contents, which leads to increased fresh gas charging, and it is secondly possible by means of channel separation to increase the flow speed, as a result of which a greater proportion of kinetic energy is imparted to the turbine wheel of a turbocharger which is coupled to the internal combustion engine, and therefore the turbine power is increased considerably.

Some turbine wheels are specifically designed to harness this pulse energy and convert it to rotational velocity. Thus the conversion of pressure and velocity from the exhaust gas for a pulse flow turbine wheel in a twin volute turbine housing is greater than the conversion of pressure and velocity from a steady state exhaust flow to the turbine wheel velocity. This pulse energy is more predominant in commercial Diesel engines, which operate at around 2200 RPM with peak torque at 1200 to 1400 RPM, than in gasoline engines, which operate at much higher rotational speed, often up to 6000 RPM, with peak torque at 4000 RPM, such that the pulse is not as well defined.

In "pulse charging" narrow diameter exhaust pipes are used to deliver the impulses from the fresh exhaust gas from the cylinders backed by the thrust of the piston to really give an impulse onto the blades of the turbine wheel. For this type of turbocharging, it is necessary to have a volute that is relatively slim in diameter and the turbine must be located adjacent to the outlet valves. This system may work for dual volute (cirumferential division) and twin scroll (parallel volutes). This system is referred to as twin volute since two volutes are always in operation, with one volute providing pulsed charges to the turbine wheel from half the cylinders, the other volute providing pulsed charges from the remaining cylinders.

By connecting the volutes of a twin volute, even if there is only a slight interconnection, the effect of pulse charging disappears, i.e. the interconnection of volutes eliminates the effect of the pulse charging so that the charger is in a working mode that might be described as pressure charging.

To increase exhaust gas throughput range, there is also "pressure charging" or divided volute, where at low engine speeds one volute may be blocked to build up the volume or pressure of exhaust gas upstream of the turbine so the pressure concentrated in the one open volute can be used to more effectively to drive the turbine wheel. Obviously, in this case it does not matter so much how far removed the turbocharger is from the outlet valves. At low engine speeds, since only one of the volutes is open, all of the exhaust gas is forced through the one volute, causing the turbocharger turbine to act like a small displacement turbocharger. With increasing engine speed the second volute gradually opens. As a result, the turbine efficiency is improved at low engine speed, and the throughput range of the turbine is increased.

The wastegate in its most simple form is a valve which can be a poppet valve, or a swing type valve similar to the valve. Typically these valves are operated by a "dumb" actuator which senses boost pressure or vacuum to activate a diaphragm, connected to the valve, and operates without specific communication to the engine ECU. The function of the wastegate valve, in this manner, is to cut the top off the full load boost curve, thus limiting the boost level to the engine. This, in effect reduces the effective flow to the turbine, when desired (e.g. to prevent overdriving of the turbine), while allowing the full range of the turbine housing flow to the turbine wheel when full flow is desired. The wastegate configuration has no effect on the characteristics of the boost curve until the valve opens. More sophisticated wastegate valves may sense barometric pressure or have electronic over-ride or control, but they also have no effect on the boost curve until they actuate to open or close the valve.

The reason this is important to turbocharger operation is that the addition of a wastegate to the turbine stage allows matching to the low speed range with a smaller turbine wheel and housing. Thus, the addition of a wastegate brings with it the option for a reduction in inertia. Since a reduction in inertia of the rotating assembly typically results in a reduction of particulate matter (PM), wastegates have become common in on-highway vehicles. The problem is that most wastegates are somewhat binary in their operation, which does not fit well with the linear relationship between engine output and engine speed.

The design and operation of dual volute turbine housings and twin volute turbine housings is well known and does not constitute a part of the invention. Reference is made to US 2011/0302911 "Twin Scroll Turbocharger with EGR Take-offs" (and particularly FIG. 1); U.S. Pat. No. 8,196,403 "Turbocharger Having Balance Valve, Wastegate, and Common Actuator"; EP 2 059 663 "Method and Device for Operating an Internal Combustion Engine"; U.S. Pat. No. 4,893,474 "Turbocharger with Dual Function Actuator"; US 2014/0271138 "Wastegate Valve and Turbocharger Having Same"; U.S. Pat. No. 6,715,288 "Controllable Exhaust Gas Turbocharger with a Double-Fluted Turbine Housing"; US 2010/0059026 "Method and Device for Operating an Internal Combustion Engine"; and U.S. Pat. No. 7,481,056, the disclosures of which are incorporated herein by reference.

This much was well known in the art, but the valve design solutions to interconnect volutes and bleed off exhaust gas where until now not elegantly solved. With the present dual sequential coaxial slider valve, it can for the first time be said that the problem is elegantly solved. This will become apparent from the following explanation of the invention using the valve in a turbine housing having dual volutes and a wastegate port.

Now that the invention has been described, We claim:

The invention claimed is:

1. A turbocharger with a turbine housing having at least a first volute, a second volute, and a wastegate, and comprising a valve housing defining one cylindrical space having a longitudinal axis, and having a first opening in communication with the first volute, a second opening in communication with the second volute, and a third opening in communication with the wastegate;
one cup-shaped piston slidable within said cylindrical space between a full closed and a full open position, and having a piston shaft,
displacement means adapted to effect selective displacement of the one cup-shaped piston between the full closed and the full open position,
wherein the valve housing is integrated in a divider wall dividing two volutes of a turbine housing,
wherein the valve housing has a cylindrical body projecting from the end opposite the displacement means and into the cup space of the cup-shaped piston when the cup-shaped piston is in the full extended position,
wherein the projecting cylindrical body has two channels for wastegate, and a cross-channel for communication between the two volutes,
wherein in the full closed position the first, second and third openings are blocked,
wherein as the cup-shaped piston is partially retracted, the independent wastegate openings are partially opened, allowing exhaust gas to escape from the volutes to the wastegates, without however any communication between the volutes, wherein a lip is provided block gas communicating between volutes, and
wherein as the cup-shaped piston is further retracted the cup-shaped piston clears the lip, and gas flows not only into wastegate but also can crosstalk between the volutes.

2. A turbocharger comprising a dual sequential coaxial slider valve, the turbine housing having at least a first volute, a second volute, and a wastegate port, and comprising a valve housing defining at least one cylindrical space having a longitudinal axis, and having at least a first opening in communication with the first volute, a second opening in communication with the second volute, and third opening in communication with the wastegate port;
a inner piston slidable within said cylindrical space between a full closed and a full open position, and having a piston shaft,
displacement means adapted to effect selective linear displacement of the inner piston between the full closed and the full open position,
a outer piston coaxial with the inner piston, the outer piston having a center axis and having a bore along the center axis, said outer piston slidable between a full closed position and a full open position;
means for urging said outer piston towards the full closed position;
wherein the piston shaft of the inner piston extends through the bore in the outer piston,
wherein in the full closed position of the inner piston the first and second openings are blocked by the inner piston and the third opening is blocked by the outer piston, and
wherein as the inner piston is moved out if the full closed position and in the direction of the full open position:
initially the inner piston unblocks the first and second openings,
after unblocking the first and second openings, the inner piston contacts the outer piston and moves the outer piston along with it against the force of the spring means, and
finally the movement of the inner piston moves the outer piston to the full open position of the outer piston in which the third opening is fully unblocked, allowing communication between the first, second and third openings.

3. The turbocharger according to claim 2, wherein said means for urging said outer piston towards the full closed position is a mechanical spring means.

4. The turbocharger according to claim 3, wherein said spring means is contained in a pneumatic actuator.

5. The turbocharger according to claim 2, wherein said means for urging said outer piston towards the full closed position is a displacement means adapted to effect selective linear displacement of the outer piston between the full closed and the full open position.

6. The turbocharger according to claim 2, wherein said turbine housing is a dual volute housing.

7. The turbocharger according to claim 1, wherein the lip is a 1-5 mm lip which blocks the cross-channel during the first 1-5 mm retraction of the cup shaped piston, and wherein said lip does not block the wastegate channels.

* * * * *